(12) United States Patent
Hogan et al.

(10) Patent No.: US 9,516,197 B2
(45) Date of Patent: Dec. 6, 2016

(54) APPARATUS AND METHOD FOR LOSSLESS COMPRESSION OF RAW COLOR SENSOR DATA FROM A COLOR ARRAY FILTERED IMAGE SENSOR

(71) Applicant: Pixspan, Inc., Bethesda, MD (US)

(72) Inventors: Keith R. Hogan, Olney, MD (US); Michael J. Rowny, Bethesda, MD (US)

(73) Assignee: Pixspan, Inc., Bethesda, MD (US)

(*) Notice: Subject to any disclaimer, the term of this patent is extended or adjusted under 35 U.S.C. 154(b) by 0 days.

(21) Appl. No.: 14/519,998

(22) Filed: Oct. 21, 2014

(65) Prior Publication Data

US 2016/0112722 A1 Apr. 21, 2016

(51) Int. Cl.
| | | |
|---|---|---|
| G06K 9/36 | (2006.01) | |
| H04N 1/64 | (2006.01) | |
| H04N 9/04 | (2006.01) | |
| G06T 3/40 | (2006.01) | |
| H04N 19/119 | (2014.01) | |
| H04N 19/593 | (2014.01) | |
| H04N 19/91 | (2014.01) | |
| H04N 19/136 | (2014.01) | |

(52) U.S. Cl.
CPC ............... *H04N 1/64* (2013.01); *G06T 3/4015* (2013.01); *H04N 9/04* (2013.01); *H04N 19/119* (2014.11); *H04N 19/136* (2014.11); *H04N 19/593* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 6,366,319 B1* | 4/2002 | Bills | H04N 9/045 348/272 |
| 6,567,559 B1* | 5/2003 | Easwar | H04N 1/41 358/1.15 |
| 2003/0090740 A1 | 5/2003 | Trelewicz | |
| 2004/0057518 A1 | 3/2004 | Knee et al. | |
| 2004/0071351 A1 | 4/2004 | Rade | |
| 2004/0081238 A1* | 4/2004 | Parhy | H04N 19/51 375/240.16 |
| 2006/0056706 A1 | 3/2006 | Marcellin et al. | |
| 2006/0222065 A1 | 10/2006 | Ramakrishnan | |

(Continued)

OTHER PUBLICATIONS

International Search Report, Written Opinion and Search History issued Feb. 8, 2016 in PCT/US15/54486.

*Primary Examiner* — Li Liu
(74) *Attorney, Agent, or Firm* — Oblon, McClelland, Maier & Neustadt, L.L.P.

(57) ABSTRACT

A method and apparatus to compress raw color-filter array (CFA) image data in a mathematically lossless manner using spatial processing techniques. The raw CFA data is transformed using a prediction algorithm and then partitioned into blocks having N rows and M columns. The blocks are clustered into groups using a clustering algorithm. Next, compression is performed on blocks within a cluster before the compressed blocks are further compressed using arithmetic coding. In some implementations, alphabet creation and correlation is performed on the CFA data before prediction transformation, and color-plane correlation is performed after prediction transformation but before partitioning into blocks. This spatial compression method can be performed efficiently on camera to compress data files, reducing the storage and data flow requirements of the camera.

20 Claims, 11 Drawing Sheets

(56) References Cited

U.S. PATENT DOCUMENTS

| | | | |
|---|---|---|---|
| 2008/0292168 A1* | 11/2008 | Winkelmann | A61B 6/032 382/131 |
| 2010/0080480 A1* | 4/2010 | Nishikawa | H04N 19/46 382/238 |
| 2012/0327097 A1* | 12/2012 | Mostafa | G06F 17/30324 345/555 |
| 2013/0308045 A1 | 11/2013 | Rhoads et al. | |
| 2014/0177971 A1* | 6/2014 | Strom | H04N 19/46 382/232 |
| 2015/0146975 A1* | 5/2015 | Romanovskiy | H04N 19/103 382/166 |
| 2015/0271355 A1* | 9/2015 | Matsumoto | H04N 1/2112 348/231.2 |
| 2015/0281539 A1* | 10/2015 | Ueki | H04N 5/232 348/298 |
| 2015/0341653 A1* | 11/2015 | Ostrovskiy | H04N 19/50 382/190 |

* cited by examiner

Figure 9

APPARATUS AND METHOD FOR LOSSLESS COMPRESSION OF RAW COLOR SENSOR DATA FROM A COLOR ARRAY FILTERED IMAGE SENSOR

BACKGROUND

Field

This disclosure relates to data processing and compression of raw color-filter array (CFA) sensor data from a digital camera or digital motion picture camera, and more particularly relates to the mathematically lossless image compression of raw CFA data using spatial-domain, rather than frequency-domain, processing methods.

Description of the Background

With the progression of time, the quality of digital cameras has improved, resulting in digital cameras producing higher quality, more detailed images. Digital cameras use charge-coupled device (CCD) or complementary metal-oxide-semiconductors (CMOS) sensors to capture image information as a series of digital values for each point or pixel. The image quality is limited, among other things, by the number of pixels (resolution) and the number of bits per color value (dynamic range). As the number of pixels has increased to produce higher resolutions, and as the bit-depth per pixel has grown, the amount of data per image has increased dramatically.

An image with 2,048 by 1,080 pixels (2K DCI) has 2.2 megapixels. A doubling of the resolution to 4,096 by 2,160 pixels (4K DCI), or 8.8 megapixels, quadruples the amount of data. Along with the increase in the number of pixels, the technology has also progressed to increase the detailed color values with more bits per pixel, called bit-depth. For example, a sensor that has a bit-depth of 8 can produce 256 color values per pixel, whereas a 12-bit sensor produces 4,096 color values per pixel.

The increase in resolution of digital cameras has thus produced more data per image, posing a challenge for the recording of each image. For example, a 10-bit HD (about 2 megapixels) sensor in three colors produces about 66 million bits, or 8.3 megabytes. More recent 4K (8.4 megapixel) digital motion picture cameras with a bit-depth of 16 produce images files with 50.3 megabytes. Since the sensor technology continues to advance, cameras are creating ever-larger data files per image. These large data files create challenges for storing the images, for moving images off a camera, for transferring into or between storage systems, and for transmission to the cloud, and for collaborating in a dispersed geographical workforce.

SUMMARY

According to aspects of this disclosure, there is provided an apparatus, comprising processing circuitry configured to (1) receive raster data representing an intensity of light at an array of pixel wells of a detector having a color-filter array; and (2) compress the raster data using spatially-based mathematically lossless compression, wherein the spatially-based mathematically lossless compression is not dictionary-based method, does not include calculation of a wavelet transform, and does not include calculation of a discrete-cosine transformation.

According to another aspect, there is provided a digital camera or digital motion picture camera, comprising: (1) a housing; (2) a lens assembly supported by the housing and configured to focus light; (3) a color-filter array configured to filter the focused light; and (4) a detector supporting the color-filter array and being supported by the housing, wherein the detector is configured to detect raw mosaic or Bayer-pattern image data representing an intensity of the filtered light at pixel well of the detector; (5) a memory; and (6) image processing circuitry configured to compress and store in the memory the raw mosaic or Bayer-pattern image data at a compression ratio of at between 1.4 and 2.5 for typical cinematic material and remain mathematically lossless.

BRIEF DESCRIPTION OF THE DRAWINGS

A more complete understanding of this disclosure is provided by reference to the following detailed description when considered in connection with the accompanying drawings, wherein:

FIG. 9 shows an implementation of a driver converting 12-bit RGGB-pattern ARRIRaw data into a standardized raster data format accepted by a compression engine.

DETAILED DESCRIPTION

Figure 1:
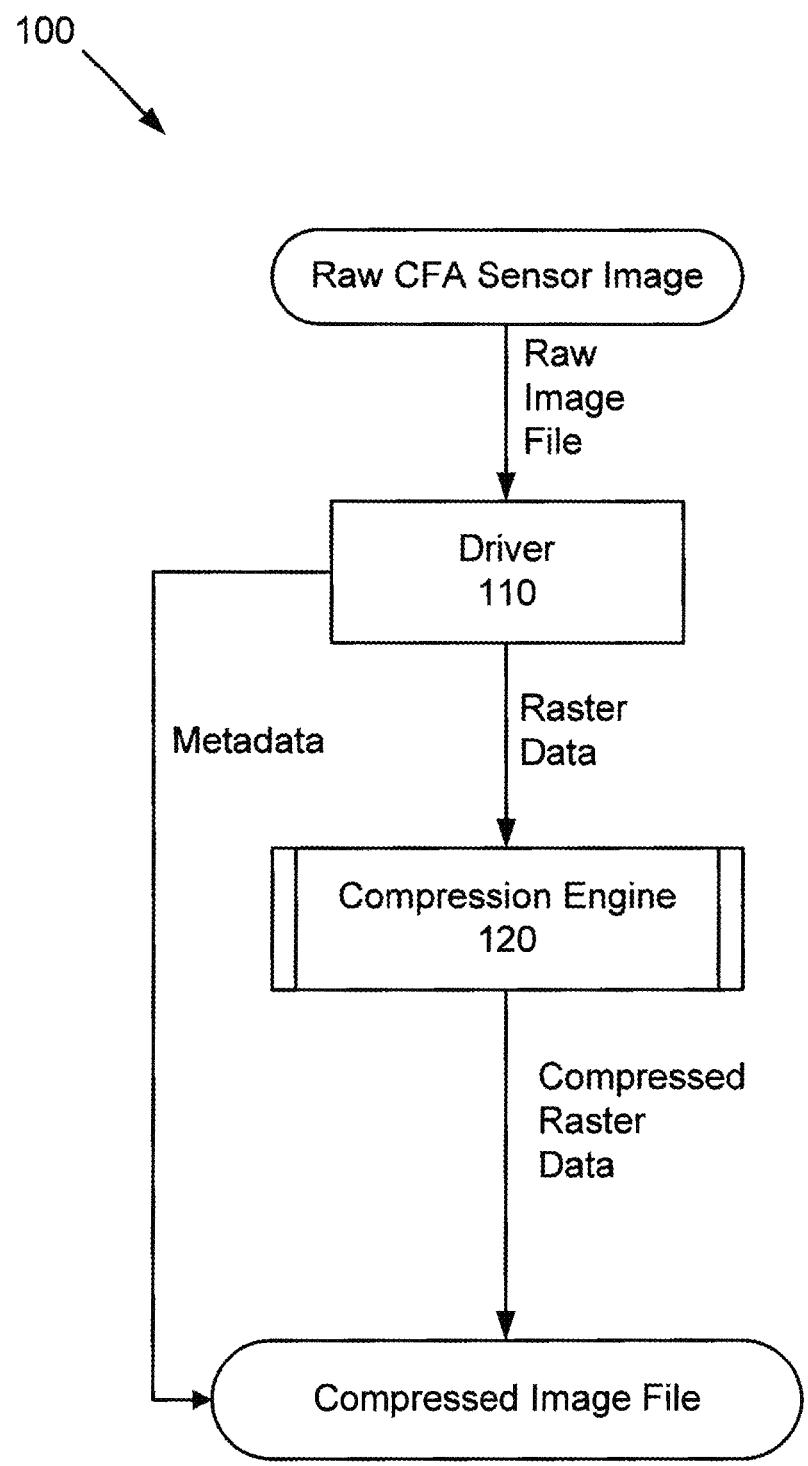
FIG. 1 is a flow diagram of one implementation of a bit-exact image compression method.

Most images contain less than the maximum allowable information calculated using Shannon entropy. Thus, the size of these data files can be decreased using data compression techniques that take advantage of patterns or redundancies in the image data. While there are many conventional techniques for lossy image compression algorithms for demosaiced images with standardized raster graphics formats, there are few compression algorithms applicable to raw sensor data from a sensor having a color-filter array (CFA), such as a Bayer pattern. Moreover, "bit-exact" compression algorithms are not employed for compressing raw CFA data because conventional bit-exact algorithms either have insignificant levels of compression for images or the algorithms require exceedingly large amounts of processing resources. The phrase "bit-exact" compression means mathematically lossless compression, wherein each bit of the original image is exactly reproduced upon a roundtrip of compression and reconstruction of the image. Bit-exact compression preserves all of the information of the original raw image, whereas lossy and "substantially visually lossless" algorithms, such as the JPEG standard, are irreversible and destroy some of the image information.

Even with the advantages of bit-exact compression, bit-exact compression has not been conventionally applied to raw sensor data because the standards-based lossless encoders (e.g., JPEG2000 Lossless, JPEG-LS, LZW, bZip, etc.) yield poor compression ratios. These standards-based lossless encoders rely on either dictionary based compression methods (e.g., LZW) or frequency-space compression (e.g., Discrete Cosine transform (DCT) methods and wavelet-based methods such as JPEG2000). Higher compression ratios of raw sensor data can be obtained using spatial correlation methods, such as the compression method discussed herein.

Conventional color digital and digital motion picture cameras capture the primary colors (additive)—red, green, and blue (R, G, B)— separately, using a CFA. Because the human visual cortex is more sensitive to color values in green, conventional CFAs, such as the Bayer pattern, usually have twice as many pixel wells dedicated to green as either the blue or red. The resulting pattern usually contains some combination of a pattern of R-G-B-G, although it could contain a pattern of color and clear sites or other patterns that capture colors just outside of the visual spectrum. The mosaic pattern of the CFA is later interpreted, or "demosaiced," producing the rendered color image. Seeing that the Bayer Pattern is conventionally the most common CFA, the process of demosaicing is often referred to as "deBayering" the raw image data to produce the rendered color image, as discussed in Iain E. G. Richardson "Video Codec Design: developing image and video compression systems," John Wiley and Sons Inc., New York, N.Y. (2002), incorporated herein by reference in its entirety.

At higher resolutions and data rates, the images may contain too much data to send off the camera over standard connection interfaces. In these cases, manufacturers use one of two methods to record the image data: (1) record the Bayer Pattern on removable memory-bus-attached high-speed storage devices (recording to removable memory cards severely limits the amount of time that the camera can record); or (2) further process the Bayer Pattern with lossy compression in order to record the data on the camera.

Examples of lossy compression that camera manufacturers use are variants of JPEG or MPEG. Lossy compression is an irreversible process in which the original image data can never be recovered. Lossy compression is used for several reasons: it generally offers a high rate of compression; it achieves this compression (or data reduction) with minimal perceived loss of visual fidelity; it requires a manageable amount of computing that can be carried out on the camera; and it can produce a constant bit rate, i.e., the same amount of data for each frame. To denote that the lossy compression deletes or modifies data, but was designed to have a minimal effect on the ultimate appearance of the image, suppliers often use the terms "visually lossless," "substantially lossless," "nearly lossless," etc. Nonetheless, all of these terms refer to lossy compression where the fidelity of the original image is compromised.

Using the method and apparatus described herein, the raw Bayer Pattern or other CFA patterns can be encoded and compressed on the camera immediately after reading the raw image from the sensor, resulting in reduced data sizes that can be recorded or transferred off-camera to later be decoded to obtain a mathematically lossless, or "bit-exact," reproduction of the raw sensor image. The reproduced Bayer Pattern data can be deBayered and post-processed in a subsequent step. In this fashion, the fidelity of the original image is preserved completely.

Embodiments disclosed herein overcome the above-disclosed challenges, wherein it has been difficult to compress Bayer patterns losslessly in a computationally efficient manner or in a manner that achieves significant compression, using conventional methods. Two general challenges exist when conventional lossless compression methods are applied to Bayer patterns. Conventional algorithms for image compression typically transform image raster data using Discrete Cosine/Wavelet Transforms (JPEG variants), i.e., transforming the data from the spatial domain to the frequency domain. These conventional algorithms technique are effective for lossy compression because they are efficient at locating and removing information from an image that is close to imperceptible, e.g., high frequency noise. But, when these conventional algorithms are employed for "bit exact" lossless encoding, they require multiple passes over the data, and they are computationally inefficient. Also, these techniques have limitations with respect to pixel data comprised of floating point values. These factors can make lossless encoding of Bayer Patterns using conventional image compression methods either unfeasible or uneconomical.

FIG. 1 shows a method 100 of efficiently processing raw CFA image data, such as a Bayer Pattern, to obtain a compressed image having a higher compression ratio, i.e., a compression ratio of between 1.4 and 5:1 depending on the nature of the image.

In step 110 of method 100, a driver receives the raw image data and parses out the metadata and the raster data. The driver formats the raster data into a canonical standardized format accepted by a compression engine. The driver interprets and extracts the metadata from the original raw image and formats the raster data for the compression-engine process 120. The driver extracts the image information from the metadata, including: the number of color planes (e.g., RGB, Alpha channels, IR channels, etc.), the bit depth for each plane (e.g., some formats allow different bit depths for each plane), the pixel data type (e.g., integer, signed/unsigned, floating point), the image width, the image length, and the data organization (e.g., scan lines or tiles, chunky or planar, 4:4:4 or 4:2:2, etc.). In the resultant compressed image file, the metadata is left uncompressed and is combined with the compressed raster date in compression-engine file format. In this way, the metadata can be read from the compressed image file, and the compressed image files can be searched using the metadata without decompressing each file.

The driver also decides how the various planes will be grouped into compression blocks. For example, in one implementation, if the image has 2 planes of 10-bit colors and one plane of 16-bit colors, the driver would partition these into separate compressible sections, and would present the sections separately to the compression engine process 120. In one implementation, if an image has 16-bit RGB planes and a 1-bit Alpha Channel, the driver will similarly partition these into separate compressible sections.

Method 100 accommodates raw images with any number of color planes (or Alpha channels). In addition to controlling the bit-exact round trip of the raster data, the driver is also responsible for returning the metadata on a round trip (decompression) so the entire file is a bit-exact replica of the original. The phrase "round trip" refers to, in one leg of the round trip, the image data being compressed, and, in a second leg of the round trip, the compressed image being decompressed and restored to a bit-exact reproduction of the original raw image. Image file formats recognized by the driver include: TIFF®/GeoTIFF®, DICOM®, OpenEXR™, DPX®, CINEON®, Canon c500 Raw™, Adobe DNG™, and ARRIRaw™.

Figure 2:
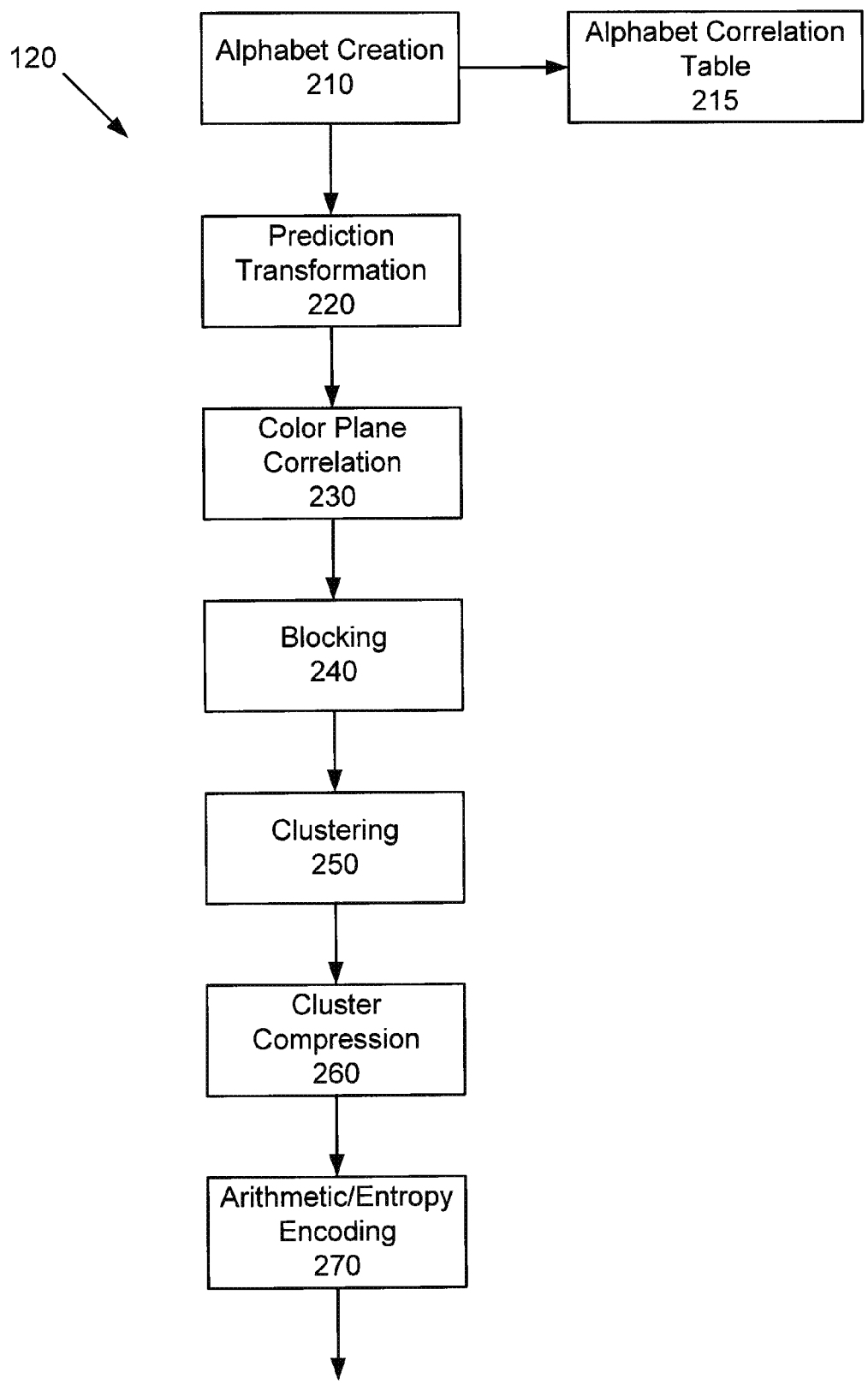
FIG. 2 is a flow diagram of one implementation of a compression engine process.

In FIG. 1 the compression image process 120 receives the uncompressed raster data from the driver in step 110 and compresses the raster data using spatially-oriented data-centric processing steps, which are described with respect to FIG. 2.

FIG. 2 shows the compression engine process 120. The first step 210 of the compression engine process 120 is alphabet creation and reduction. In one implementation, the representative pixel values, typically represented as numerical values, e.g., from 1 through 65,535 (for a 16-bit sample), are each represented by a symbol from an alphabet of symbols. No symbol is generated for any pixel values that are not represented.

An alphabet correlation table 215 is created relating the symbols to the numerical values indicating the light intensity at the pixels, i.e. the alphabet is compacted to consecutively numbered symbols. The step of alphabet creation and reduction 210 and the alphabet correlation table 215 is optional and can be omitted in some implementations of process 120. In one implementation, the alphabet creation and reduction 210 step and the alphabet correlation table 215 are omitted from the process 120.

Next, in step 220 of process 120, a prediction transformation is performed on the raster data. In step 220, process 120 calculates a predicted value of each pixel (the target pixel) in the raster data, and then transforms the raster data by subtracting the predicted value of each pixel from the actual value of each pixel of the raster data. Using appropriate parameters for the prediction, this prediction transformation provides a reversible transformation resulting in less variation among the transformed values than the variation among the pixel values of the original raster data. In one implementation, an averaging prediction algorithm is used to calculate the predicted values, as discussed in U.S. Pat. No. 7,412,104, incorporated herein by reference in its entirety.

Figure 3A:
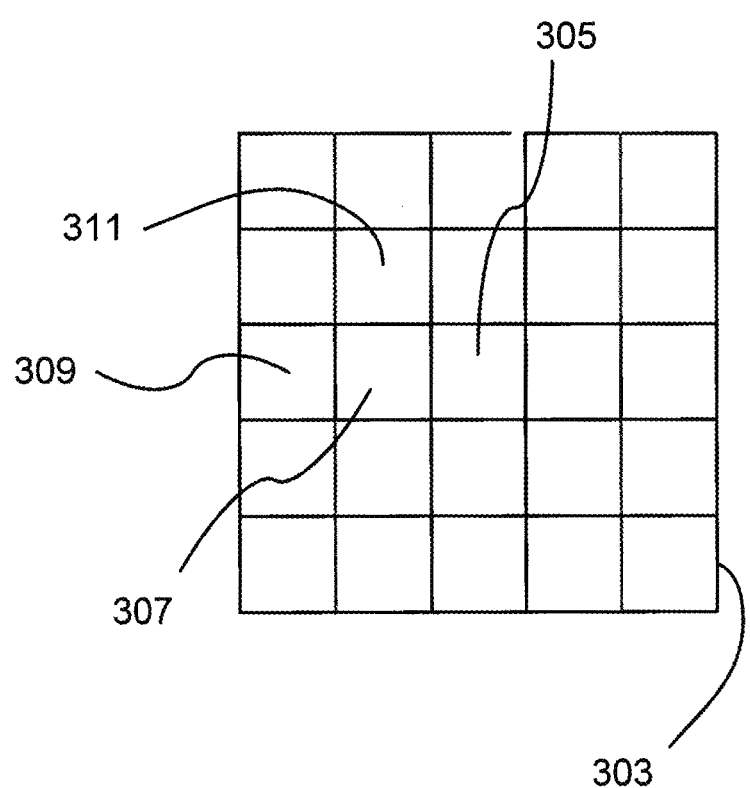
FIG. 3A is a drawing of an implementation of a pixel array showing the spatial arrangement of nearest neighbor pixels and second nearest neighbor pixels.

In one implementation, the predicted value of a pixel is given as a weighted average of the values of the raster data for the pixels adjacent on the left, and on the line above, the upper left, and directly above the target pixel In one implementation, the predicted value at each pixel is determined by averaging the values of the nearest neighbors and the second nearest neighbors of the pixel, as shown in FIG. 3A. A nearest neighbor of a pixel is any other pixel abutting on the pixel. Thus, as shown in FIG. 3A, pixel 307 is a nearest neighbor of pixel 305, and pixel 309 is a second nearest neighbor of pixel 305. The determination of the predicted value of pixel 305 can be determined by different weighted averages of its nearest neighbors and second nearest neighbors. For example, pixels abutting the corner of pixel 305, such as pixel 311 may be given less weight than pixels like 307 that abut flush against cell 305.

In one implementation, the calculation of predicted values commences in the upper left corner of the array 303. One value of the array 303, e.g., that in the upper left corner, and the array of differences is sufficient to recover the value of all the array elements by adding the difference elements, pixel by pixel, spreading outwards from the corner.

In one implementation, prediction values are calculated by recognizing common characteristics of image data, such as vertical and horizontal edges as well as gradients. For instance, if pixel 307 and 311 are very close in value, and the pixel directly above 305 significantly differs from 307 and 311, this may indicate a vertical visual edge such that the predicted value of 305 should be identical to the pixel above it, and the values of 307 and 311 would not be used.

For most images, the difference values are less varied than the initial data. Thus, looking for patterns among the difference values will be more successful than if there were no preprocessing of the raster image data. Indeed the type of averaging to form predicted values may be chosen to reduce the variation of the preprocessed data. The entropy of the data formed by different averaging techniques can be calculated, and the method of averaging that produces the least entropy can be utilized.

Figure 3B:
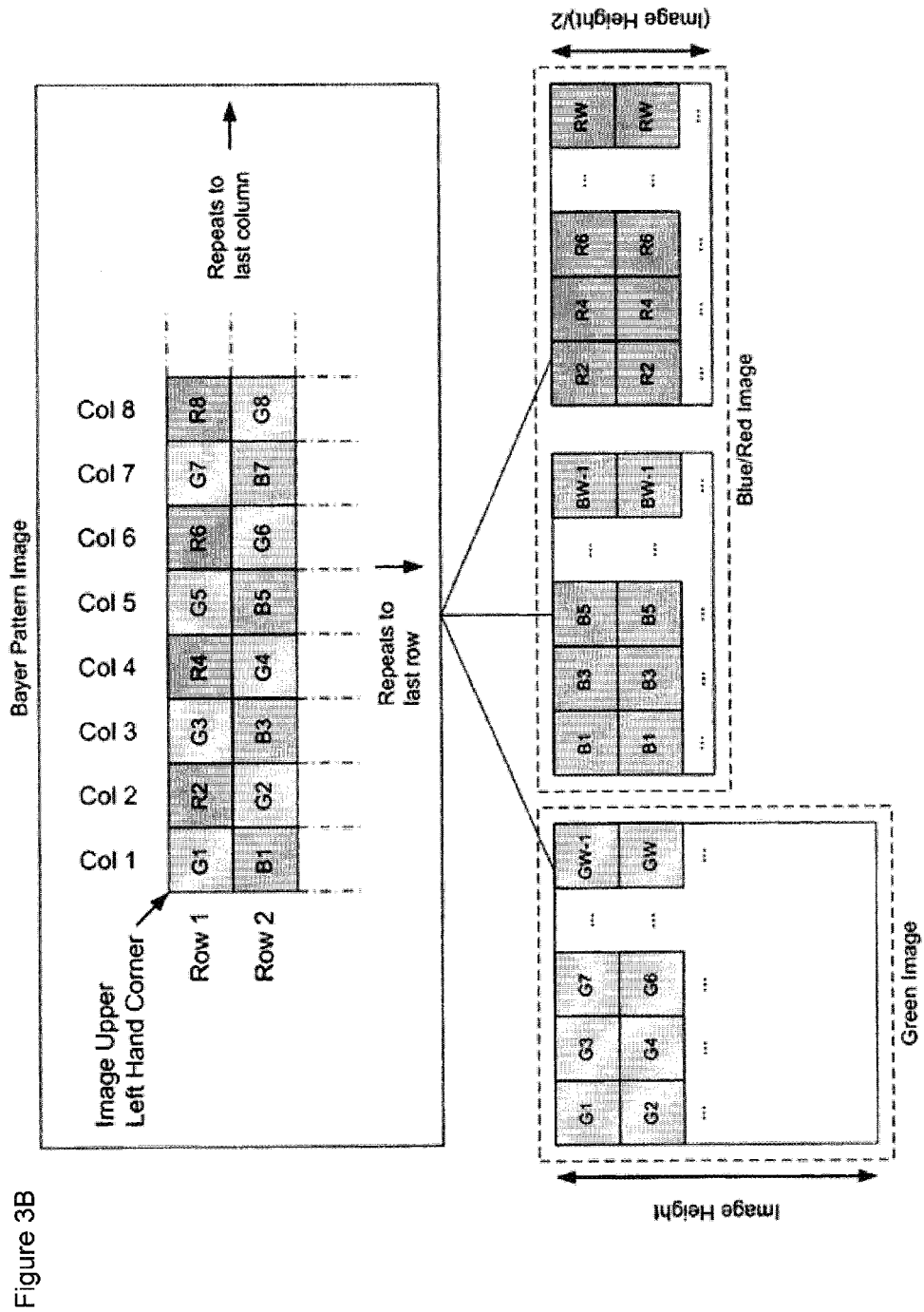
FIG. 3B is a drawing of one implementation of a Bayer Pattern, wherein, for purposes of processing the Bayer Pattern, a color plane containing only the Green values can be separated from color plane containing the Red color values and Blue color values.

Next, in step 230 of process 120, a color-plane correlation is performed on the prediction-transformed raster data. As shown in FIG. 3B, the transformed raster data from the CFA is separated into different color planes. For example, all the green values are placed in one plane and all of the red and blue values are placed in another plane, as shown in FIG. 3B. In another implementation, all the green values are separated into one plane, all of the red values are separated into another plane, and all blue values are separated into a third plane. In FIG. 3B, the number of pixels in the green array is double the number of pixels in either the blue or red arrays because the Bayer pattern has twice as many green pixels as blue or red pixels.

After separating the data into color planes, the values of each plane can then be compared to other color planes, and the entropy of the difference between color planes can be compared with the entropy of each color plane separately. If the difference between the two color planes is less than the entropy of one of the color planes, then, without loss of information, the difference may be used rather than using the color plane having the greater entropy. In one implementation, the process 120 omits the color-plane correlation step 230.

Next, in step 240 of process 120, the transformed and color-plane-correlated raster data is partitioned into N-by-M blocks having N rows of pixels and M columns of pixels. The optimal block size depends on the nature of the image. For example, in one implementation, the optimal block size of images produced by a medical scanner is smaller than the optimal block size of images produced by a digital motion picture camera. When the file type, determined from the metadata, indicates that a smaller block size is optimal, then, in step 240, the number of rows N and the number of columns M are set to predetermined lower values. Similarly, when the file type, determined from the metadata, is determined to correspond to a data type requiring larger optimal block sizes, then, in step 240, the number of rows N and the number of columns M are each set to predetermined larger values.

Next, in step 250 of process 120, the N-by-M blocks are arranged into clusters according to similarities between blocks. For example, in one implementation, similarities between blocks can be determined by the normalized overlap integrals between the blocks. In one implementation, similarities between blocks can be determined by various distance measures, by taking the difference between two block and the calculating the norm of the difference using, e.g., the $L^1$ norm, the $L^\infty$ norm, $L^2$ norm, etc. Similarity among blocks can also be determined by comparing the average gradient, higher-order derivatives, edge-effects, or parameters relating edge transitions of the blocks. In one implementation, the parameters used in clustering the blocks include the sum of the square roots of the absolute value of the pixel values within each block, the minimum value of each block, the maximum value of each block, and the root mean square of the values in the block. Similarity can also be determined by inverting, rotating, and reflecting the blocks and then comparing the blocks to determine similarity.

In one implementation, blocks having all zeros (i.e., blocks for which the prediction transformation in step 220 of process 120 yielded a perfect transformation) are identified and separated from the remaining blocks, and further clustering and processing is performed on the remaining blocks.

The clustering of the blocks in step 250 can be based on a multivariable analysis of many similarity measures, including the similarity measures discussed above. The cluster analysis method used to group blocks into clusters can be any of known clustering methods, including: connectivity-based clustering, hierarchical-based clustering, centroid-based clustering, distribution-based clustering, density-based clustering, basic sequential algorithmic schemes, or a combination of clustering methods. In one implementation, the number of clusters is constrained to be less than or equal to a predetermined maximum number of clusters.

Next, in step 260 of process 120, blocks within each cluster are further processed to minimize the entropy calculation within the cluster by relying on the similarities between blocks in the cluster. By minimizing the entropy of each cluster, arithmetic encoding of the clusters results in smaller data sizes for the compressed image files. All processing of the clusters is reversible. In one implementation, the minimum value of the block is subtracted from each pixel in the block. In one implementation, prediction transformation, as discussed in U.S. Pat. No. 7,414,104 and as discussed in regards to step 220 of process 120, is performed on the clusters and on the blocks.

In one implementation, the blocks perfectly matching another block within the cluster can be consolidated and represented by a single block. Also, blocks for which the prediction transformation yielded perfect results (e.g., zeros) can be identified and treated separately. The remaining clusters of blocks are then reduced based on cluster parameter values. After this reduction step, the blocks are transformed through the prediction algorithm in step 120.

Next, in step 270 of process 120, each cluster of processed blocks is arithmetically encoded. The method of arithmetic encoding can be Huffman encoding or some other known method of arithmetic encoding.

Finally, the arithmetically encoded block data and the alphabet correlation table are combined with the uncompressed metadata from step 110 of method 100 to obtain the compressed image file.

Each of the steps 210, 220, 230, 230, 240, 250, 260, and 270 is perfectly reversible, and therefore, the method of decompressing the compressed image file to obtain bit-exact raw CFA data can be realized by performing the reverse process for each step, in the reverse order of process 120 (i.e., the reverse process of arithmetic encoding is preformed to reverse step 270, then the reverse process of the compression for the clustered blocks is preformed to reverse step 260, etc.).

TABLE 1

| Image Characteristic | Approximate Compression Ratio |
| --- | --- |
| Solid color images (such as a black screen), or images with blocks of solid colors (such as a test pattern) | Up to 1,000:1 |
| Camera-produced Title/Credit Screens (typically black background with white lettering) | Between 50:1 and 250:1 |
| Non-complex images with perhaps a block of solid color (such as a landscape with a blue sky or color medical images) | Between 2:1 and 5:1 |
| Indoor scene with complex patterns (intricate clothing, bookcases, or movement creating blur) | Between 2:1 and 3.5:1 |
| Noisy or grainy images such as are produced with low light or very bright light conditions or with blurriness caused by fast camera panning. | Between 1.4:1 and 2:1 |

In contrast to conventional compression methods that either rely on signal processing in the frequency domain (e.g., JPEG, which uses DCT, and JPEG2000, which uses wavelet transformations) or use a dictionary-based method (e.g., as bZip or LZW), the compression method 100 is a new type of compression method performed using correlations and pattern recognition methods in the spatial domain. This method exhibits superior performance compared to conventional methods, achieving the compression ratios shown in Table 1, while requiring relatively modest computational resources compared to conventional methods, such as JPEG2000 Lossless. Moreover, the computational tasks with the steps of process 120 can be parallelized to run simultaneously on multiple processors, taking advantage of multi-processing and hyper-threading, architectures generally available on conventional central processing units.

Using method 100, the Bayer Pattern can be compressed using a lossless codec designed to run on a miniaturized circuit, such as an FPGA, ASIC, or CPU-based processor when the compression is performed on the camera. The steps of method 100 can be optimized so as to run on the miniaturized circuits in a fashion which limits power consumption, since the camera or image sensor device is often portable and must rely on on-board power.

By compressing the raw image data directly from the sensor, the data footprint from the codec is much smaller. This smaller data footprint is advantageous, and potentially necessary, for higher resolution cameras, where the high data rates of the camera make bottlenecks limiting the transfer of data from the camera problematic. This smaller data footprint is also advantageous for smaller cameras, such as those common in handheld user equipment such as a smartphone, having limited power and memory. An increasing number of cameras are mobile, of which the largest and fastest-growing category is smartphones. Using lossless compression to encode Bayer Patterns can thus preserve the fidelity of images from smartphone cameras.

Method 100 offers a novel method of compressing Bayer Patterns in a bit-exact or mathematically lossless way. Method 100 uses the scarce computational resource of the camera for lossless encoding, rather than for deBayering and creating a rendered image on the camera, which can be performed later when the image is rendered for display.

Method 100 can be used with any image data captured by a sensor having a CFA, whether the sensor creates an RGB Bayer Pattern, and RGBW Pattern, a CMYK array, or some other known CFA. For example, different camera manufacturers use different bit-ordering and storing methods. Also, whether the sensor captures at 8-bits or 16-bits, the photosite values may be captured in fewer bits. For example, a 16-bit sensor may be used to create 12-bit color values per pixel. The pixel data values can be stored in any of a number of formats, including fixed (integer), floating point, log, and linear. The lossless compression methods embodied here are able to handle any or all of these data formats.

The photosite values can be stored into groups of bits for the purpose of packing or efficiency in later steps. This data structure can differ for different sensors and cameras. Using the data structure associated with the Bayer Pattern implemented for an individual camera, the color patterns can be both separated by color (R, G, or B) so that arrays of each color can be processed separately and differently.

Figure 4:
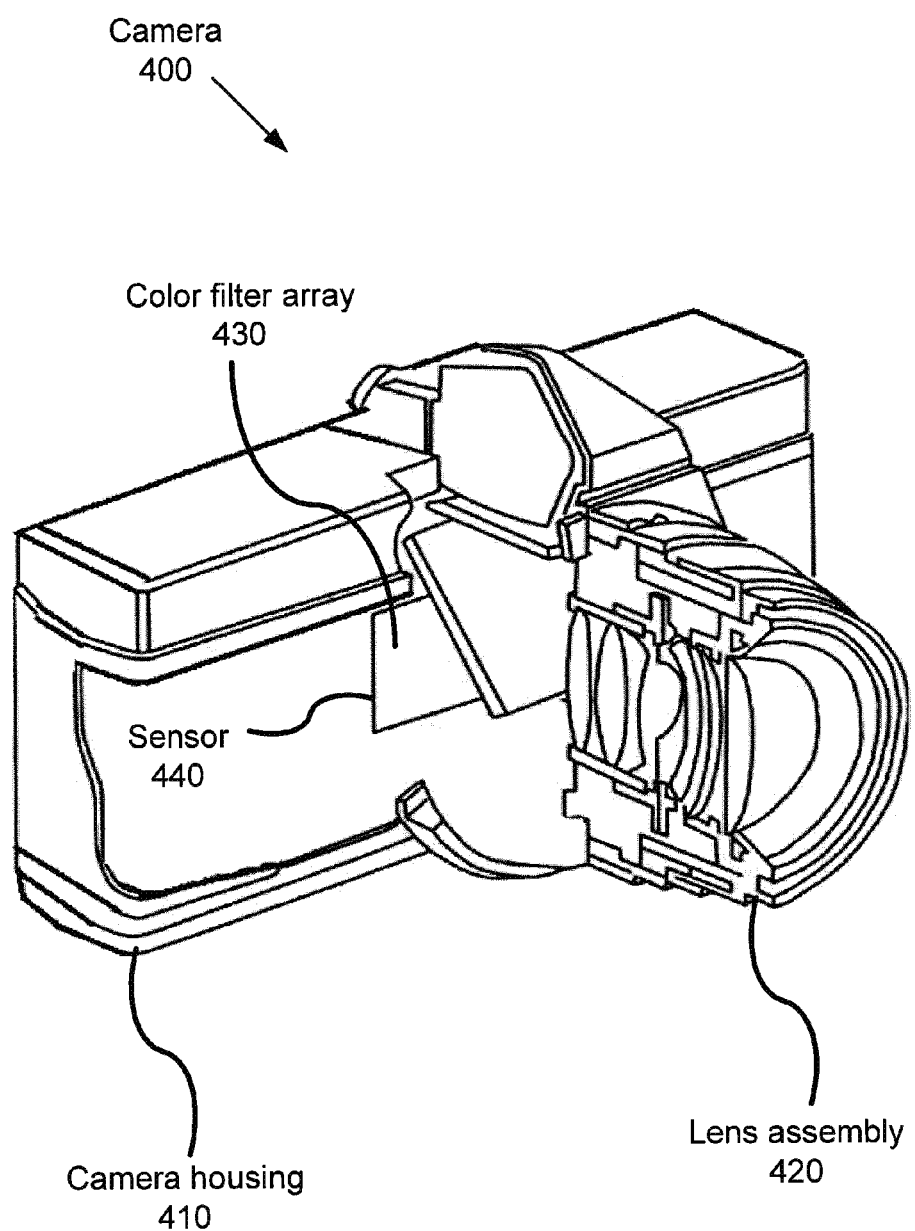
FIG. 4 is a drawing of one implementation of a camera.

FIG. 4 shows an implementation of a camera 400. The camera 400 includes a housing 410, providing structure and support to the other elements of the camera 400. A lens assembly 420 focuses light onto a light sensitive sensor 440 having a color-filter array 430 positioned in the light path between the lens assembly and the detector elements of the sensor 440. In one implementation, the color-filter array 430 adheres directly to the surface of the sensor 440. The camera 400 can also include (not shown) input devices, control switches, displays, processing circuitry, and computer-readable storage devices to improve and support the functionality of the camera 400. In one implementation, the camera records still images. In one implementation, the camera records moving images. In one implementation, the camera records, alternatively, both still images and moving images. In one implementation, the camera produces a thumbnail proxy image (lossy) in addition to the Bayer Pattern image.

Figure 5:
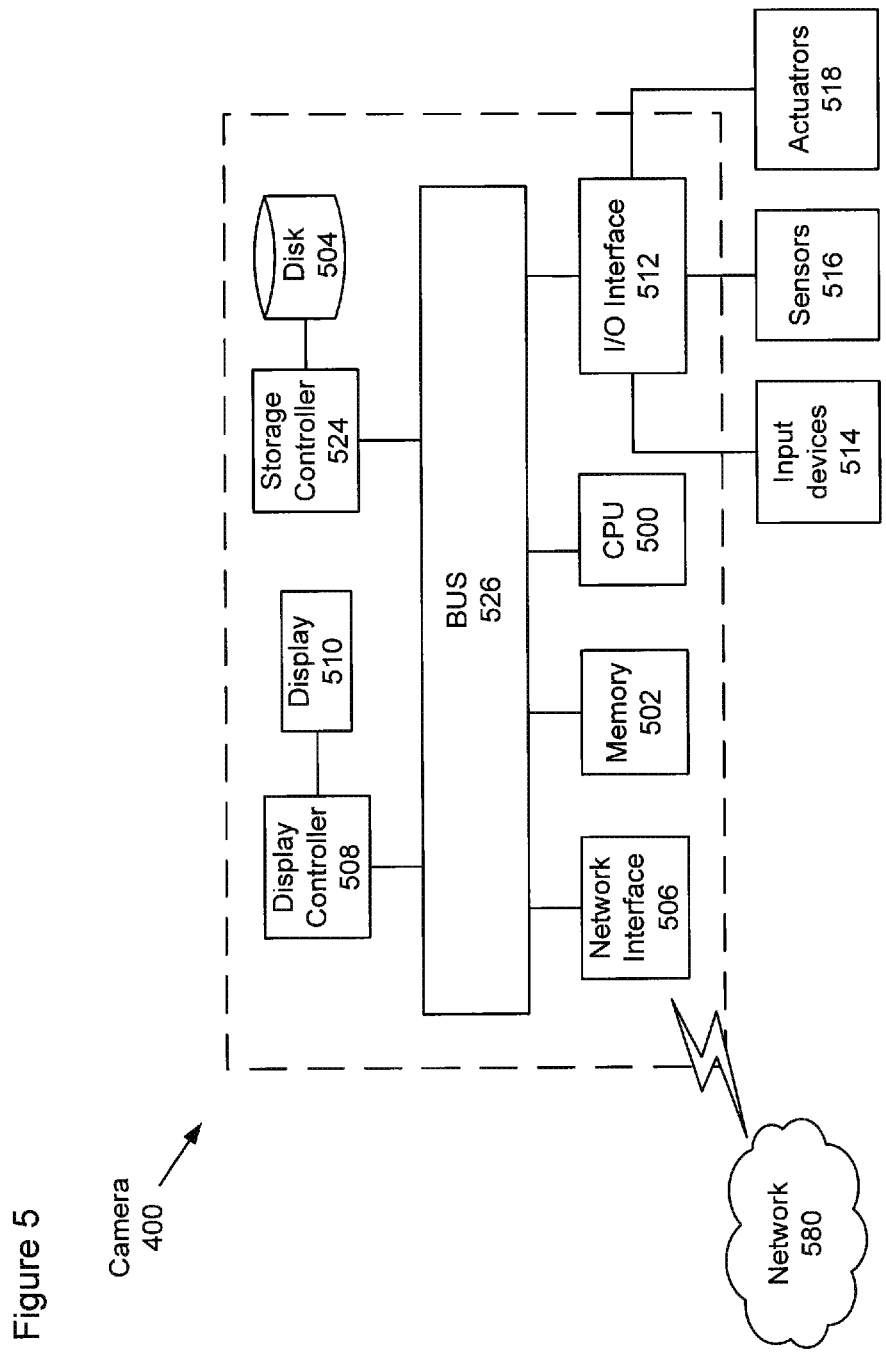
FIG. 5 is a schematic drawing of one implementation of processing circuitry in a camera.

Next, a hardware description of the processing circuitry of the camera apparatus 400 according to exemplary embodiments is described with reference to FIG. 5. In FIG. 5, the camera apparatus 400 includes a CPU 500 which performs the image compression processes described above with respect to methods 100 and 300. The process data and instructions may be stored in memory 502. These processes and instructions may also be stored on a storage medium disk 504 such as a nonvolatile memory card, a hard drive (HDD), or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the Camera apparatus 400 communicates, such as a server or computer.

CPU 500 can be a Xenon or Core processor from Intel of America, an Opteron processor from AMD of America, a snapdragon processor from Qualcomm, an A5 processor from Apple Inc., an OMAP processor from Texas Instruments, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The camera apparatus 400 in FIG. 5 also includes a network interface and controller 506, such as wireless antenna, a micro USB port, or a mini USB port connected to network controller such as an Intel Ethernet PRO network interface card from Intel Corporation of America, for interfacing with network 580. As can be appreciated, the network 580 can be a public network, such as the Internet, or a private network such as a wired connection, a LAN, or WAN network, or any combination thereof and can also include PSTN or ISDN sub-networks. The network 580 can also be wired, such as USB port or an Ethernet network, or can be wireless such as a cellular network including EDGE, 3G and 4G wireless cellular systems. The wireless network can also be WiFi, Bluetooth, or any other wireless form of communication that is known.

The camera apparatus 400 further includes a display controller 508 for interfacing with display 510, such as and LCD screen or a Hewlett Packard HPL2445w LCD monitor. The display can optionally be integrated into the camera 400 or can be external to the camera 400. A general purpose I/O interface 512 interfaces with input devices 314 such as buttons and a touch screen panel on or separate from display 510 in order to, among other things, receive inputs and modify settings. The sensors 516 can also include an acoustic transducer, such as a microphone, to detect sound. General purpose I/O interface also connects to actuators 518 including actuators adjusting the lens assembly, aperture, and lighting element (e.g., camera flash) of the camera 400. The actuators 518 can also include an audio speaker or piezoelectric transducer.

The general purpose storage controller 524 connects the storage medium disk 504 with communication bus 526, which may be an ISA, EISA, VESA, PCI, or similar, for interconnecting all of the components of the Camera apparatus 400. A description of the general features and functionality of the display 510, input devices 514, as well as the display controller 508, storage controller 524, network controller 506, and general purpose I/O interface 512 is omitted herein for brevity as these features are known.

Figure 6:
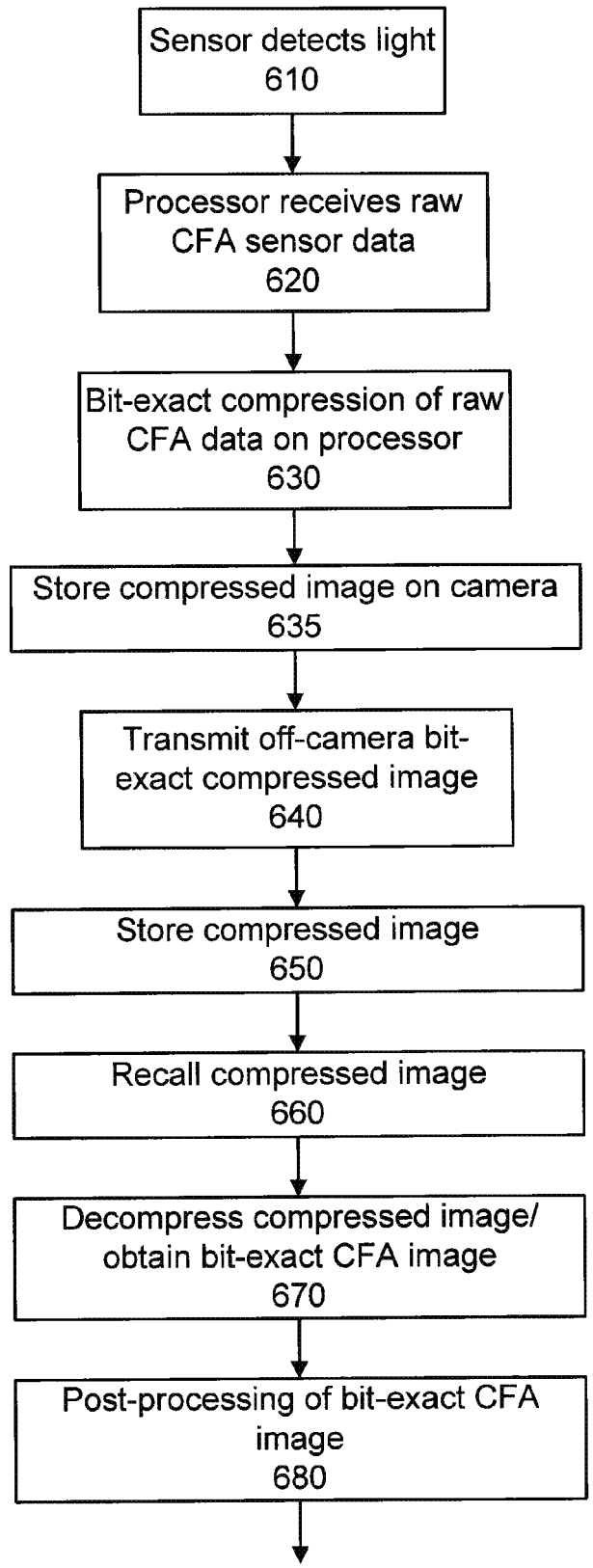
FIG. 6 is a flow diagram of one implementation of a method of compressing, storing, and processing raw color-filter array (CFA) image data.

FIG. 6 shows a method 600 of using the compression method 100 to losslessly transfer images off camera using a reduced data stream and losslessly store the images off camera with a reduced data file size (optional).

Method 600 begins by the sensor detecting light at step 610.

Next, at step 620, raw sensor data indicative of the detected light is transmitted to the processing circuitry.

Next, at step 630, bit-exact compression of the raw sensor data is performed using method 100.

Next, at step 635, the compressed image is recorded on a computer-readable memory on the camera.

Next, at step 640, the compressed image is transferred off of the camera. The compressed image can be transferred using a wireless network connection, or the compressed image can be transferred using a wired connection. The compressed image can be transferred to a single computer-readable memory, or to a distributed computer network, or to computer-readable memory accessed using cloud computing.

Next, at step 650, the compressed image can be stored on a computer-readable medium for later retrieval.

Next, at step 660, the compressed image can be retrieved from a computer-readable medium.

Next, at step 670, the compressed image can be decompressed into the raw CFA image for further processing, rendering, and viewing.

Next, at step 680, the raw CFA image can be processed for rendering and viewing. These processing steps can include demosaicing (e.g., deBayering), noise reduction, and image sharpening. In demosaicing, an image processor can process the raw CFA image by evaluating the color and brightness data of a given pixel. The image processor compares color and brightness data of a given pixel with the data from neighboring pixels and then uses a demosaicing algorithm to produce an appropriate color and brightness value for the pixel. In one implementation, the image processor can also assess the whole picture to guess at the correct distribution of contrast. By adjusting a gamma value (heightening or lowering the contrast range of an image's mid-tones) subtle tonal gradations, such as in human skin or the blue of the sky, the colors can be made to become much more realistic. In a noise reduction process, the image processor can detect random spots of obviously wrong color in an otherwise smoothly-colored area and correct these anomalous color spots accordingly. In a noise reduction process, the image processor attempts to separate the noise from the image information and to remove it. In an image sharpening process, the image processor corrects for image softening at boundaries. To preserve the impression of depth, clarity and fine details, the image processor can sharpen edges and contours.

In one implementation, the encoded Bayer Patterns can be uploaded directly from the camera to cloud storage, using a wired or wireless network connection. Using the cloud storage, the compressed image files can be stored. In one implementation, the compressed image files transferred to cloud storage can be decoded to the raw CFA image format and then stored using cloud storage or the raw CFA image can be deBayered and/or further processed and then stored using cloud storage. The deBayered image can also be made available for further post-processing, such as editing, color correction, visual effects, and sound sweetening. The applications for these post-processing functions can also be performed in the cloud, leading to efficiencies, lower costs, and greater collaboration.

In one implementation, the compression method 100 can be used to achieve a reduction in file storage space. Over the course of functions downstream of the camera, the user can save significant amounts of data and time. For example, the encoded Bayer Pattern can be stored using digital storage that is smaller than the original Bayer Pattern or significantly smaller than the fully-rendered image. These smaller files can be transmitted wirelessly where bandwidth is typically limited. In addition, the files that have been reduced through this novel method can be subsequently decoded and deBayered where more computing and more storage are readily available, such as in an external device or in the cloud.

In one implementation, multiple compressed images can be grouped together in file containers. As an option in the case of video, the encoded files can be placed in a container such as tar or Zip. The advantage of these containers is that they create a single file of a video clip that helps them be transmitted more efficiently than as individual frames. The creation of the tar or Zip container in conjunction with the Bayer Pattern compression is suitable for file-based transfers because the encoding and Zip (for example) can be performed simultaneously, avoiding any significant incremental delay.

In one implementation, the compression method 100 can be used to achieve better flow control. Because each image in a series or in video can have a different entropy value, lossless compression produces encoded files that are different in size for each frame. In order to make it easier to record these frames, it is often desirable to introduce flow control, a process to buffer images to produce a steadier flow, closer approximating a constant bit-rate. The fundamental principles of lossless encoding are thus not compromised, but the recording process can often accommodate the steadier flow more easily.

In one implementation, the compression method 100 can be used with stationary and non-mobile devices. This novel method can be used in cases in which the encoding takes place on the device, which has its own recording medium, such as a camera that records in its own memory and/or to a digital recording device, such as flash memory. The camera is typically also capable of generating in parallel a file with a low quality (such as JPEG) snapshot. In this way, the image or frame can be viewed for content directly on the portable or fixed device. Once recorded, the compressed data is transported using a physical recording medium, such as flash memory, later connected to an external device. Once connected to an external device, the data can be further processed, such as decoding and deBayering. At that point, the data can be rendered into a usable image format such as EXR, DPX, TIFF, DICOM, or the like. As a result, the bandwidth and storage close to the sensor has been minimized, and the full fidelity preserved for downstream processing.

In one implementation, the compression method 100 can be used with mobile devices. In mobile devices, this novel compression of raw Bayer Pattern data can be employed to reduce the data of an image for immediate transmission or storage on the mobile device for later transmission. In either case, the resulting minimized data can be transmitted wirelessly by the mobile device to a base unit for further processing or forwarded to the cloud for storage and further processing. This includes wireless transmission from fixed or portable cameras, such as cinematic cameras. Mobile cameras may be repurposed or modified by external devices to become higher-quality imaging devices, either as cameras or as new devices such as endoscopes. In these cases, it is important to preserve the maximum fidelity possible. Lossless compression of the Bayer Pattern as disclosed herein is often the only practical means of preserving the full fidelity of such imaging data.

Figure 7:
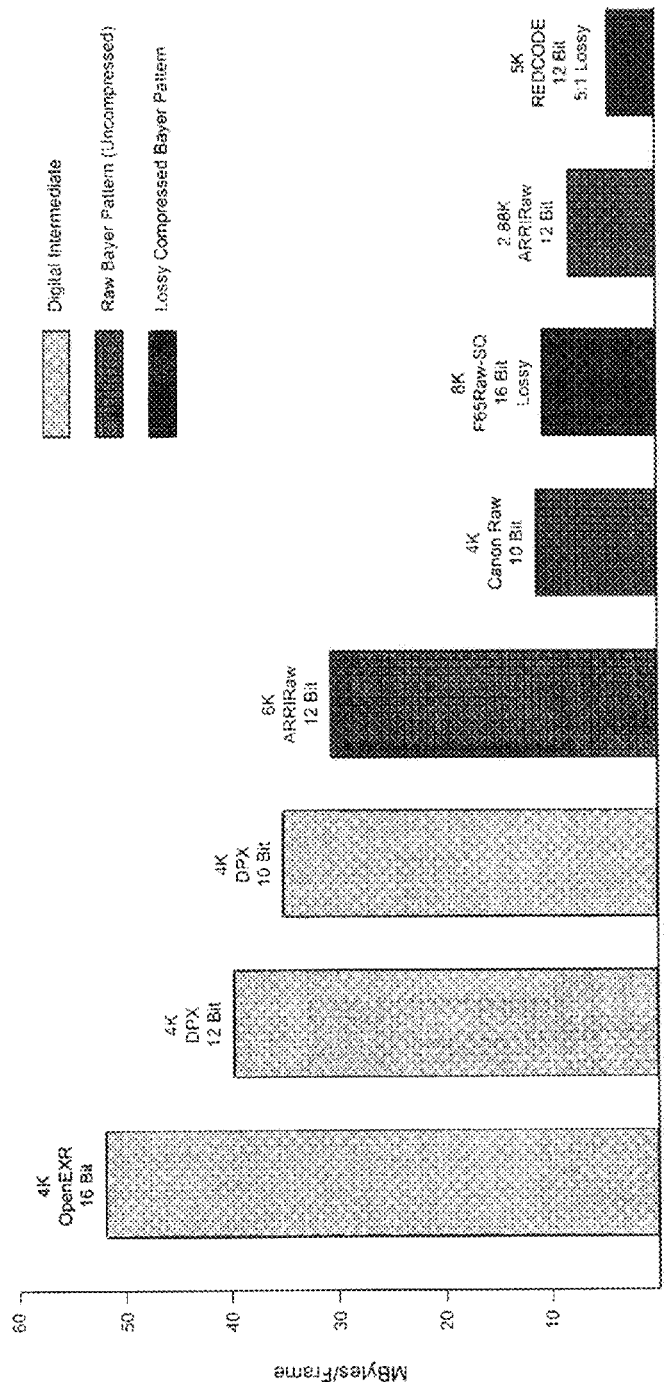
FIG. 7 shows a bar chart of file sizes of image files having different formatting configurations, bit depths, and resolution.

FIG. 7 shows a bar graph of the size of image files for images corresponding to file formats, including: 4k OpenEXR 16-bit, 4k DPX 12-bit, 4k DPX 10-bit, 6k ARRIRaw 12-bit, 4k Canon Raw 10 bit, and 2.88k ARRIRaw 12 bit. Also shown in FIG. 7 are Lossy compressed image data sizes for file formats of 8k F65Raw-SW 16-bit (Lossy) and 5k REDCODE 12 bit 5:1 (Lossy).

Figure 8:
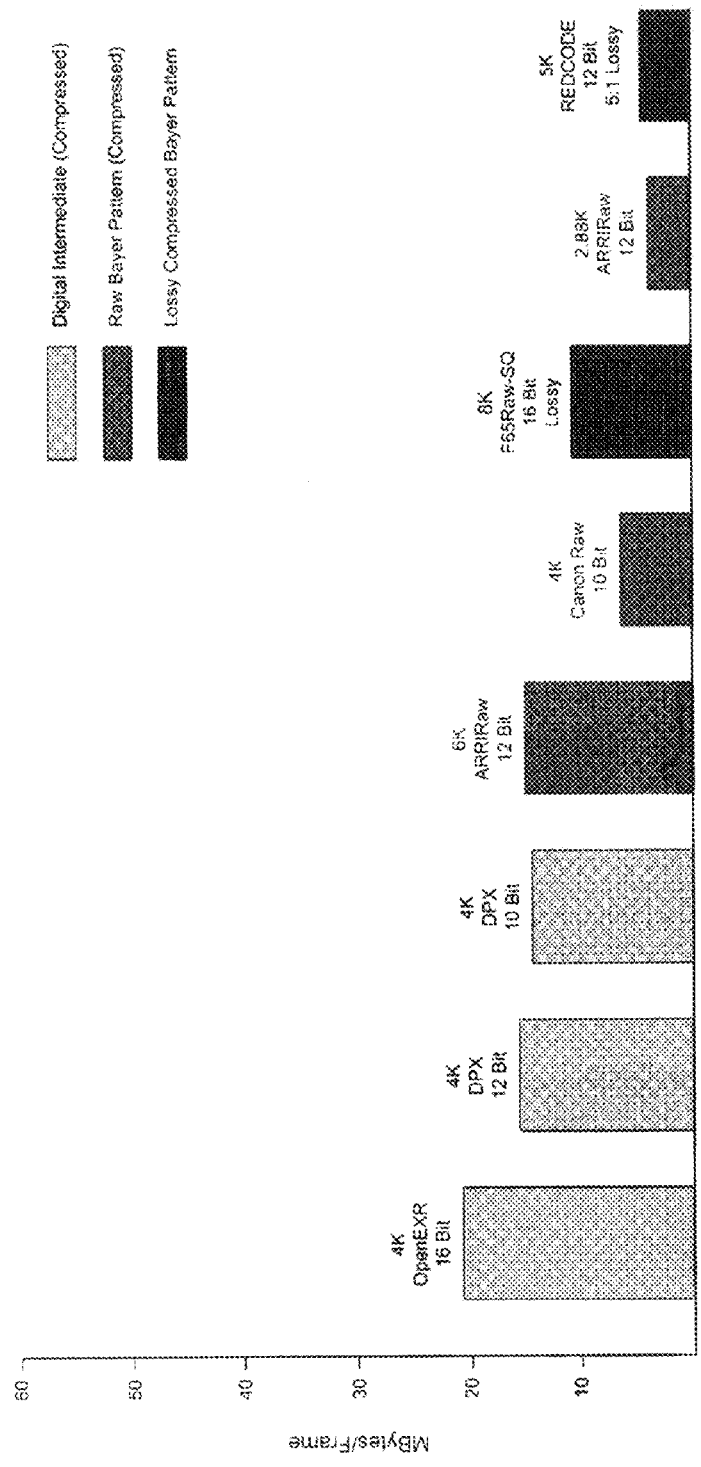
FIG. 8 shows a bar chart of file sizes of the same image files shown in FIG. 7, except the raw image files (i.e., those image files not undergoing lossy compression in FIG. 7) have been compressed using one implementation of a bit-exact spatial-based compression method.

FIG. 8 shows a bar graph of the compressed size of image files using the method described herein for bit-exact compression of images. The file types shown in FIG. 8 are the same as the file types shown in FIG. 7 (i.e., 4k OpenEXR 16-bit, 4k DPX 12-bit, 4k DPX 10-bit, 6k ARRIRaw 12-bit, 4k Canon Raw 10 bit, and 2.88k ARRIRaw 12 bit). Also shown in FIG. 8 are Lossy compressed image data sizes for file formats of 8k F65Raw-SW 16-bit (Lossy) and 5k REDCODE 12 bit 5:1 (Lossy).

A comparison of the results represented in FIG. 7 and FIG. 8 illustrates that compression ratios of greater than 2:1 can be achieved for most image formats. Moreover, the bit-exact image compression results in data sizes approaching the lossy data sizes without sacrificing data in an irreversible compression process.

Figure 9:
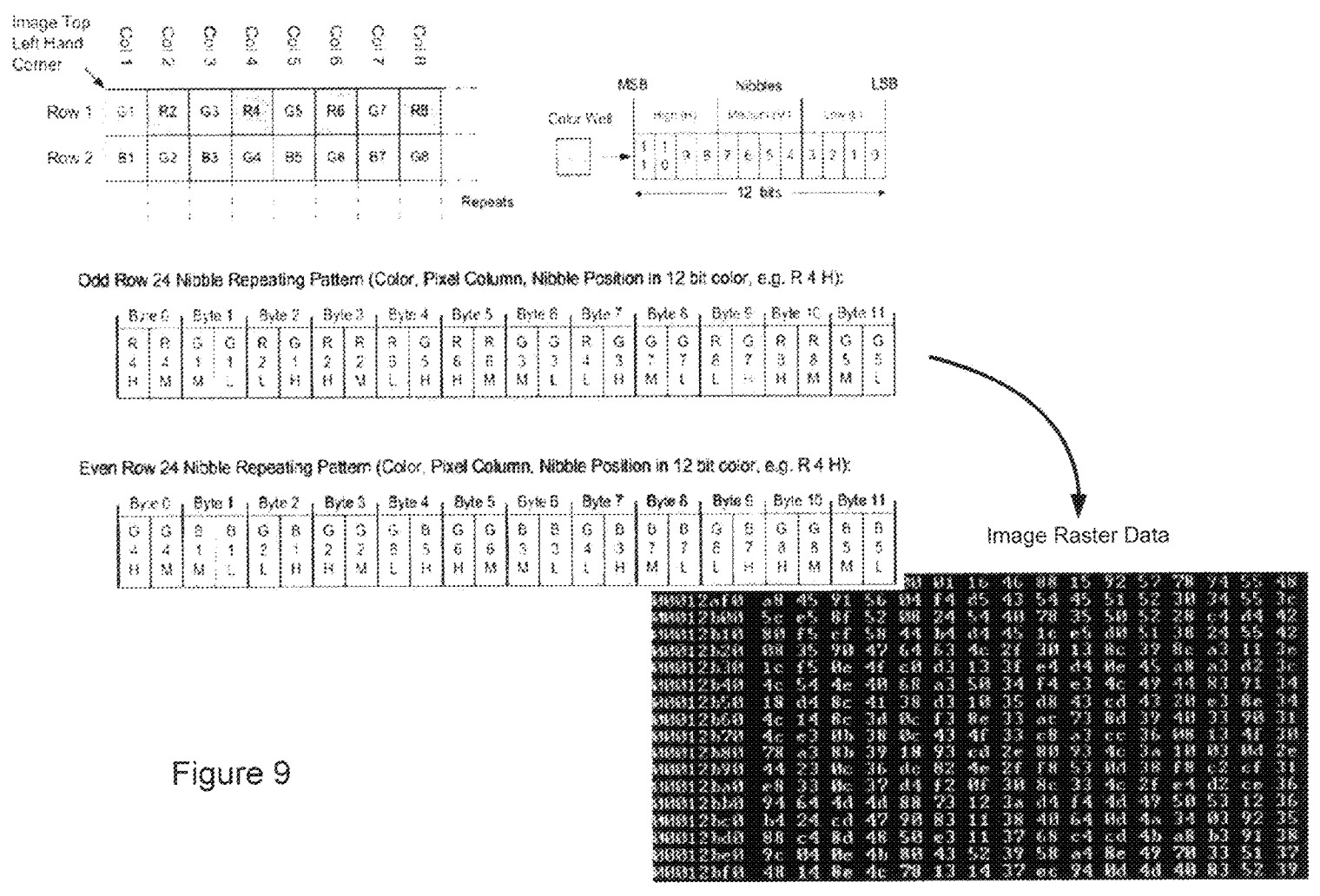

FIG. 9 provides an example of how 12-bit RGGB-pattern data of the file type having a file extension of ".ari" is formatted into raster data by the driver 110 in preparation for the compression engine 120.

Figure 10:
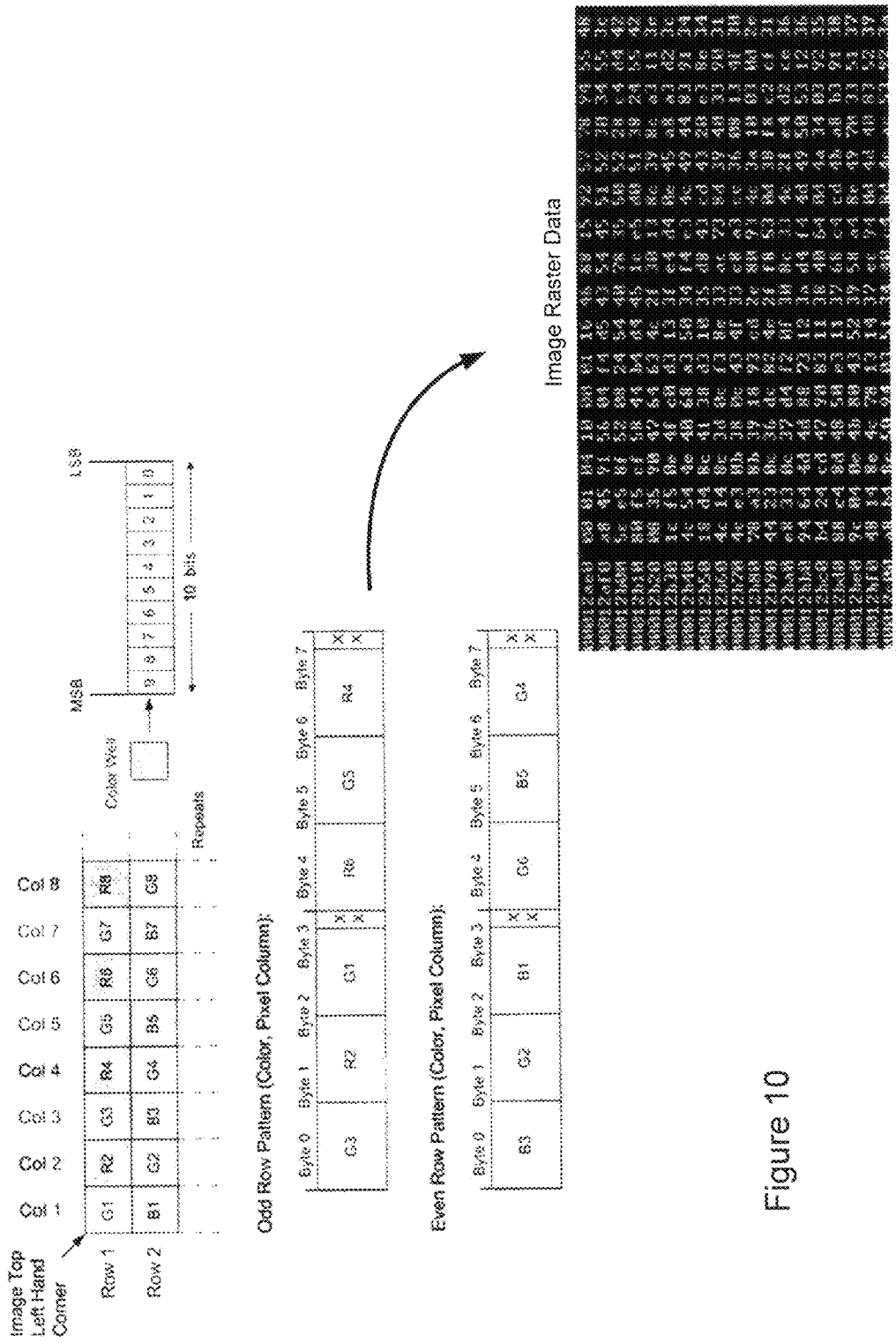
FIG. 10 shows an implementation of a driver converting 10-bit RGGB-pattern DPX 2.0 data into a standardized raster data format accepted by a compression engine.

FIG. 10 provides an example of how 10-bit RGGB-pattern data using a user defined DPX 2.0 file type having a file extension of ".rmf" is formatted into raster data by the driver 110 in preparation for the compression engine 120.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus, comprising:
   a memory to store image data based on raw mosaiced raster data representing an intensity of light received at an array of pixel wells of a detector having a color-filter array; and
   processing circuitry configured to
      obtain the stored image data; and
      compress the obtained image data using spatially-based mathematically lossless compression,
   wherein the processing circuitry is further configured to group blocks of the image data into clusters according to indicia of spatial similarity among the blocks, wherein the indicia of spatial similarity include a minimum value of each block, a maximum value of each block, and a sum value of each block, wherein the sum value of each block is a sum over a square root of an absolute value of each pixel value within the block.

2. The apparatus according to claim 1, wherein the processing circuitry is further configured to compress the image data by
   correlating symbols of an alphabet of symbols with the values of the image data, a first pixel of the image data and a second pixel of the image data are correlated to a same symbol of an alphabet of symbols when a value of the first pixel of the image data is equal to a value of the second pixel of the image data, and
   the image data, when encoded using the alphabet of symbols, has a smaller data size than the image data when encoded using pixel values.

3. The apparatus according to claim 2, wherein the processing circuitry is further configured to compress the image data by
   transforming the image data using a prediction transformation by taking a difference of the image data and predicted values of the image data, wherein each predicted value corresponds to a pixel of the detector and the predicted value is a weighted average of pixel values neighboring the pixel corresponding to the predicted value.

4. The apparatus according to claim 3, wherein the processing circuitry is further configured to compress the image data by
   separating the transformed data into color planes, wherein each color plane includes transformed data corresponding to pixels of a color of the color-filter array;
   determining difference planes among the color planes, each difference plane being a difference between a first color plane and a second color plane;
   determining a plurality of color-plane combinations, wherein each color-plane combination is a combination of three planes including at least one of the color planes and at most two of the difference planes;
   evaluating an entropy of each of the determined plurality of color-plane combinations; and
   selecting a color-plane combination of the plurality of color-plane combinations having a lowest entropy to obtain color-plane data.

5. The apparatus according to claim 4, wherein the processing circuitry is further configured to compress the image data by
   partitioning the color-plane data into the blocks, which are of equal size and shape;
   grouping the blocks into the clusters using a clustering method blocks according to similarity measures and indicia of a spatial variation of image data within each block; and
   perform prediction transformation on the blocks within a cluster to reduce an entropy calculation of the cluster to obtain prediction transformed cluster data.

6. The apparatus according to claim 3, wherein the processing circuitry is further configured to compress the image data by:
   partitioning the transformed data into blocks of equal size and shape;
   grouping the blocks into the clusters using a clustering method that groups blocks according to similarity measures and indicia of a spatial variation of image data within each block; and
   performing prediction transformation on the blocks within a cluster to reduce an entropy calculation of the cluster to obtain prediction transformed cluster data.

7. The apparatus according to claim 6, wherein the processing circuitry is further configured to compress the image data by performing arithmetic encoding on the prediction transformed cluster data to obtain arithmetic encoded data.

8. The apparatus according to claim 7, wherein the processing circuitry is further configured to compress the image data by:
   separating the raw mosaiced raster data into metadata and the raster data; and
   combining the arithmetic encoded data with the metadata to obtain a compressed image file and record the compressed image file on a computer-readable medium.

9. A camera, comprising:
   a housing;
   a lens assembly supported by the housing and configured to focus light;
   a color-filter array configured to filter the focused light; and
   a detector supporting the color-filter array and being supported by the housing, wherein the detector is configured to detect raw mosaiced data representing an intensity of the filtered light at pixel elements of the detector and to store, in a memory, image data based on the detected raw mosaiced data;
   the memory storing the image data; and
   image processing circuitry configured to obtain the stored image data, losslessly compress the obtained image data, and store, in the memory, the compressed image data,
   wherein
   the image processing circuitry is further configured to group blocks of the image data into clusters according to indicia of spatial similarity among the blocks, wherein the indicia of spatial similarity include a minimum value of each block, a maximum value of each block, and a sum value of each block, wherein the sum value of each block is a sum over a square root of an absolute value of each pixel value within the block.

10. The camera according to claim 9, wherein the image-processing circuitry is further configured to compress the obtained image data without using a frequency-domain compression method.

11. The camera according to claim 9, wherein the image-processing circuitry is further configured to compress the obtained image data without calculating a wavelet transformation or a discrete-cosine transformation.

12. The camera according to claim 9, wherein the image processing circuitry is further configured to correlate pixel values of the image data with symbols of an alphabet of symbols, wherein
 a symbol correlated to a first pixel value is the symbol correlated to a second pixel value when the first pixel value equals the second pixel value, and
 each symbol of an alphabet of symbols is correlated to at least one pixel value of the image data.

13. The camera according to claim 12, wherein the image processing circuitry is further configured to transform the image data by subtracting from the image data predicted pixel values, each predicted pixel value of a pixel element of the detector being a weighted average of the image data corresponding to neighboring pixel elements of the pixel element.

14. The camera according to claim 13, wherein the image processing circuitry is further configured to
 separate the transformed image data into color planes, wherein each color plane includes transformed data corresponding to pixels of a color of the color-filter array;
 determine difference planes among the color planes, each difference plane being a difference between a first color plane and a second color plane;
 determine a plurality of color-plane combinations, wherein each color-plane combination is a combination of three planes including at least one of the color planes and at most two of the difference planes;
 evaluate an entropy of each of the determined plurality of color-plane combinations; and
 select a color-plane combination having the lowest entropy to obtain color-plane data.

15. The camera according to claim 13, wherein the image processing circuitry is further configured to separate the transformed image data into color planes, wherein each color plane includes transformed data corresponding to pixels of a color of the color-filter array.

16. The camera according to claim 15, wherein the image processing circuitry is further configured to
 partition each color-plane into the blocks, which are of equal size and shape;
 group the blocks into the clusters according to the indicia of spatial similarity among the blocks using a clustering method, wherein the indicia of spatial similarity are determined by a spatial variation of pixel values within each block.

17. The camera according to claim 16, wherein the image processing circuitry is further configured to perform prediction transformation on the blocks within a cluster to reduce an entropy calculation of the cluster to obtain prediction transformed cluster data.

18. The camera according to claim 17, wherein image processing circuitry is further configured to perform arithmetic encoding on the prediction transformed cluster data.

19. The camera according to claim 17, wherein the image processing circuitry is further configured to combine an arithmetic encoded data with metadata to generate a compressed image file and record the compressed image file in the memory.

20. The apparatus of claim 1, wherein the processing circuitry is further configured to compress the image data using the spatially-based mathematically lossless compression, which has a compression ratio between 1.4 and 1000.

* * * * *